United States Patent [19]

Maguire et al.

[11] Patent Number: 5,188,576
[45] Date of Patent: Feb. 23, 1993

[54] SELF-PILOTING THRUST WASHERS

[75] Inventors: Joel M. Maguire, Dearborn; Arlis Hall, Rochester Hills, both of Mich.

[73] Assignee: General Motors Corporation, Detroit, Mich.

[21] Appl. No.: 819,909

[22] Filed: Jan. 13, 1992

[51] Int. Cl.⁵ .......................... F16H 3/44; F16H 57/04
[52] U.S. Cl. ....................................... 475/348; 475/159; 475/253; 384/564; 384/569; 384/424
[58] Field of Search ............... 384/127, 564, 569, 424; 475/159, 160, 253, 348

[56] References Cited

U.S. PATENT DOCUMENTS

| | | |
|---|---|---|
| 3,293,948 | 12/1966 | Jarchow et al. ............... 475/348 X |
| 4,480,492 | 11/1984 | Fujioka et al. ...................... 74/467 |
| 4,776,237 | 10/1988 | Premiski et al. ............. 475/159 OR |

FOREIGN PATENT DOCUMENTS

| | | | |
|---|---|---|---|
| 0040509 | 12/1956 | Fed. Rep. of Germany ...... 384/564 |
| 2506869 | 12/1982 | France ................................. 384/564 |
| 0820237 | 9/1959 | United Kingdom ................ 384/564 |
| 1264447 | 2/1972 | United Kingdom ................ 384/564 |

*Primary Examiner*—Leslie A. Braun
*Assistant Examiner*—Daniel Wittels
*Attorney, Agent, or Firm*—Donald F. Scherer

[57] ABSTRACT

A thrust washer pilots on an end of a planet gear. The piloting relationship is established by an outside diameter surface of the washer and an inside diameter surface of the planet gear. Piloting of the thrust washer on an outside diameter surface of the washer permits the provision of a radial gap between the thrust washer and a shaft on which the gear rotates, facilitating lubricant flow past the washer in an axial direction along the shaft, as well as facilitating assemble of the planet gear and thrust washer to a planet gear carrier.

5 Claims, 1 Drawing Sheet

SELF-PILOTING THRUST WASHERS

TECHNICAL FIELD

This invention relates to thrust washers used with planetary gears in power transmissions, particularly in motor vehicle automatic transmissions.

BACKGROUND OF THE INVENTION

Automatic transmission planetary gear carrier assemblies commonly employ rotatable thrust washers between a planet gear and an associated gear carrier flange. The thrust washers provide a reaction surface for thrust loads generated by the transmission of torque between the planet gear and meshing sun and ring gears.

In planetary gear assemblies for automobile transmissions, thrust washers, in addition to sustaining the applied thrust loads, will ideally facilitate a flow of lubricant reaching a bearing surface of the planet gear and a shaft on which the planet gear rotates. It is also desirable for the design of the thrust washers to facilitate assembly of the planet carrier.

Well known are thrust washers which pilot on an outside diameter of the shaft on which the planet gear rotates. The piloting relationship between the shaft and the thrust washer, however, inhibits oil flow between them. Additionally, the washers and the gear must be individually aligned with a shaft when placing them on the shaft.

It is also known to provide a channel in the carrier flange on a side proximate to the washer extending radially inward from the shaft. Such a channel by itself is largely ineffective in providing lubricant to the bearing surfaces of the planet gear and the shaft and an interposed needle roller bearing because there is little radial space between the thrust washer and the shaft when the thrust washer pilots on the shaft.

It is further known to provide the planet gears or the thrust washers with channels in respective facing surfaces to facilitate lubricant flow to the bearing surface. The channels, however, reduce surface area between the gear thrust surface and the thrust washer, resulting in a higher load per unit of area between the gear and the thrust washer.

It is yet further known to provide thrust washers with a plurality of notches at their inside diameters in combination with a channel in the carrier flange. These notches and the piloting portions between the notches form a cloverleaf pattern at the inside diameter of the washer, allowing lubricant to pass to the bearing surface when one of the notches overlaps the channel in the carrier. However, if a piloting portion of the washer overlaps the channel, the flow of lubricant to the shaft would be blocked much as if there were no notches at the thrust washer inside diameter. Also, when two such thrust washers are used together, the piloting portion of one washer may overlap the notches of the other washer, resulting in the same minimal flow to the bearing surface as if a washer with no relief notches were used.

SUMMARY OF THE INVENTION

This invention facilitates assembly of a planet gear carrier assembly. The invention also makes provision for lubrication to reach the shaft bearing surface. The invention additionally maximizes contact area between the washer and the gear. These advantages result from having the thrust washer pilot on an inside diameter of the planet gear instead of an outside diameter of the shaft.

It is an object of this invention to provide a thrust washer, planet gear, and planet gear carrier, having the washer disposed between the gear and a flange of the carrier, having an outside diameter surface of the thrust washer piloting with an inside diameter surface of the planet gear, the washer providing radial clearance with a shaft on which the planet gear rotates.

It is also an object of this invention to provide a thrust washer, planet gear, and planet gear carrier, having the washer disposed between the gear and a flange of the carrier, having an outside diameter surface of the thrust washer piloting with an inside diameter surface of the planet gear, the washer providing radial clearance with a shaft on which the planet gear rotates, the washer having a flat annular shape, the outside diameter surface of the washer provided by the outside diameter of the washer, and a carrier flange of the planet gear carrier having a channel in a side facing the gear.

It is yet a further object of this invention to provide a thrust washer, planet gear, and planet gear carrier, having the washer disposed between the gear and a flange of the carrier, having an outside diameter surface of the thrust washer piloting with an inside diameter surface of the planet gear, the washer providing radial clearance with a shaft on which the planet gear rotates, the washer having a flat annular portion and a cupped portion, the cupped portion projecting from an inside diameter of the flat annular portion, the outside diameter surface of the washer provided by the outside diameter of the cupped portion, and a carrier flange of the planet gear carrier having a channel in a side facing the gear.

These and other objects and advantages will be more apparent from the following description and drawings.

DESCRIPTION OF THE PREFERRED EMBODIMENT

Figure 1:
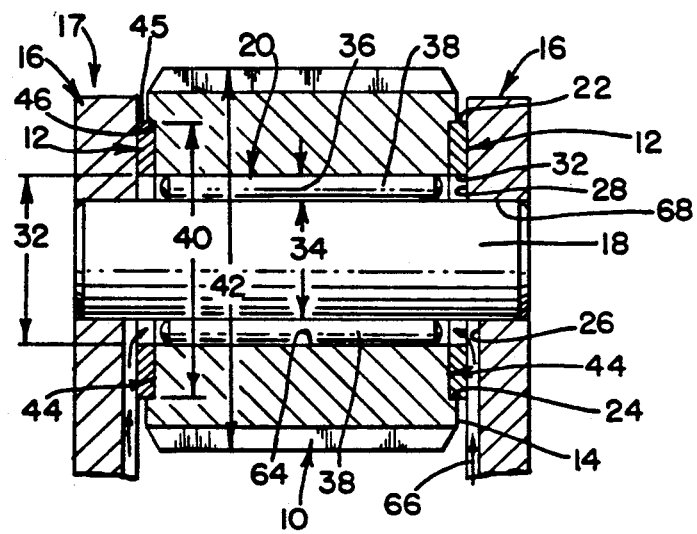
FIG. 1 is a sectional side view of a portion of a planet carrier supporting a planet gear with a flat thrust washer at each end of the planet gear.
Figure 2:
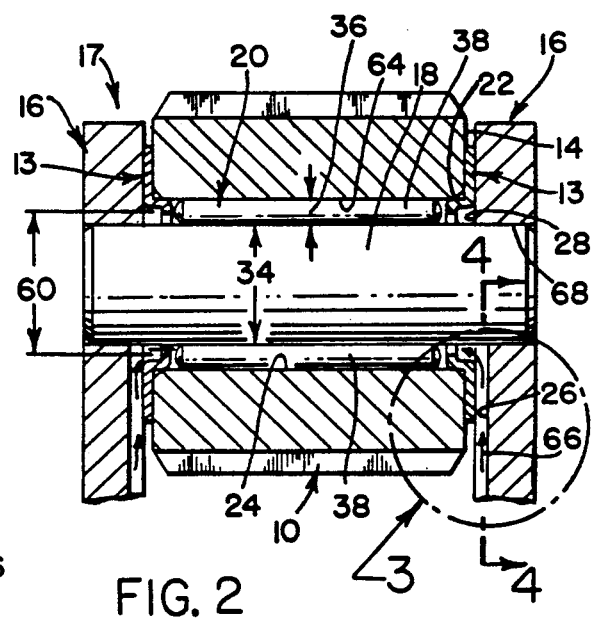
FIG. 2 is a sectional side view of a portion of a planet carrier supporting a planet gear with a cupped thrust washer at each end of the planet gear.

In this description, the left and right sides of both FIG. 1 and FIG. 2 are shown as symmetrical about a planet gear 10 in the portions shown. It is to be understood that a reference character applied to a dimension or element on either side applies as well to the corresponding dimension or element on the other side. This symmetry is not necessary to the invention, but is used to facilitate describing the invention.

The planet gear 10 has a thrust washer 12 (FIG. 1) and 13 (FIG. 2 and FIG. 3), rotatively disposed at each planet gear end 14. The planet gear 10 and thrust washers 12, 13 are axially disposed between a pair of carrier flanges 16 of a planet gear carrier 17. Only the flanges 16 of the planet gear carrier 17 are shown in the figures. The planet gear 10 is one of a plurality (not shown) of planet gears 10 disposed between the carrier flanges 16. The planet gear 10 is radially supported by a shaft 18 with a needle roller bearing 20 radially disposed between the shaft 18 and the planet gear 10. The shaft 18 is radially supported by the carrier flanges 16.

The thrust washer 12, 13 has a washer pilot outside diameter surface 22. The planet gear has a washer pilot inside diameter surface 24. The washer pilot outside diameter surface 22 of the thrust washer 12, 13 fits within the washer pilot inside diameter surface 24 of the planet gear 10, providing a piloting relationship between the thrust washer 12, 13 and the planet gear 10, thereby radially locating the thrust washer 12, 13 relative to the planet gear 10.

The carrier flange 16 has a lubrication channel 26 on a side 28 proximate to the thrust washer 12, 13, located radially inward of the shaft 18.

There are two alternative configurations of the thrust washer 12, 13 employed in this invention. A first configuration of the thrust washer 12, shown in FIG. 1, has a flat annular shape, the thrust washer 12 so configured being called a flat thrust washer 12. The flat thrust washer 12 has a minimum inside diameter 32 equal to the shaft outside diameter 34 plus twice a diameter 36 of a needle roller 38 from the needle roller bearing 20. The flat thrust washer 12 has an outside diameter 40 less than an outside diameter of the gear 42.

The flat thrust washer 12 is associated with a cylindrical recess 44 in each end 14 of the planet gear 12. The recesses 44 are not as deep as the flat thrust washers 12 are thick. A surface 45 of the outside diameter 40 of the flat thrust washer 12 and an inside diameter surface 46 of the cylindrical recess 44 have a piloting relationship. The surface 45 of the outside diameter 40 of the flat thrust washer 12 is the washer pilot outside diameter surface 22. The inside diameter surface 46 of the cylindrical recess 44 in the end 14 of the planet gear 10 is the washer pilot inside diameter surface 24.

Figure 3:
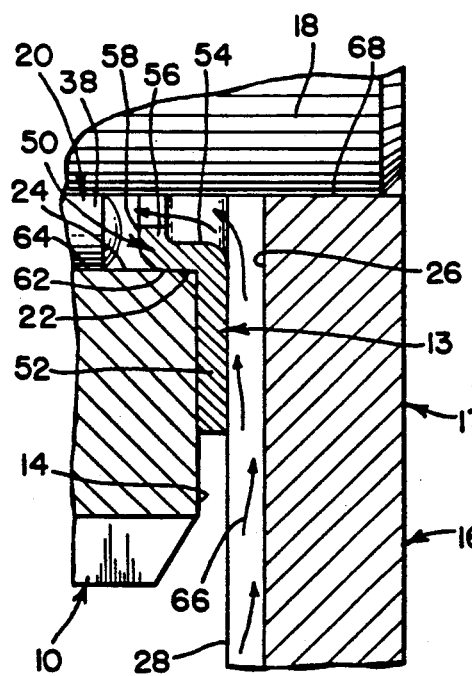
FIG. 3 is an enlargement of part of FIG. 2 included within the arrowed circle 3, showing in greater detail the relationship between the washer and the shaft and the carrier.
Figure 4:
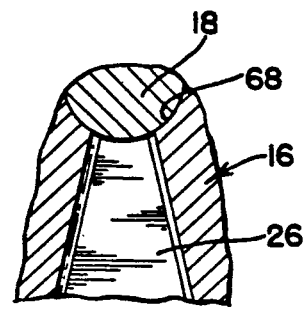
FIG. 4 is a sectional view of a side of a carrier flange facing the washer and gear as indicated by arrows 4—4, showing the channel used to direct lubricant to the shaft.

The second configuration of the thrust washer 13, called a cupped thrust washer 13 and shown in FIG. 2 and FIG. 3, has a cupped portion 50 projecting from an annular portion 52 at an inside diameter edge 54 of the annular portion 52. The cupped portion 50 is cylindrical in shape and is concentric with the annular portion 52. The cupped portion 50 has a cupped portion flange 56 projecting radially inward at an end 58 of the cupped portion 50 distal to the annular portion 52. The cupped portion flange 56 provides a minimum inside diameter 60 of the cupped thrust washer 13. The minimum inside diameter 60 of the cupped thrust washer 13 is approximately equal to the outside diameter 34 of the shaft 18 plus the diameter 36 of the needle roller 38 from the needle roller bearing 20. Having the minimum inside diameter 60 so established prevents the needle rollers 38 from impinging on the cupped portion 50 of the cupped thrust washer 13.

The cupped thrust washers 13, unlike the flat thrust washers 12, do not require the provision of cylindrical recesses 44 in the ends 14. An outside diameter surface 62 of the cupped portion 50 and a planet gear inside diameter bearing surface 64 have a piloting relationship. The washer pilot outside diameter surface 22 of the cupped thrust washer 13 is provided by the outside diameter surface 62 of the cupped portion 50. The washer pilot inside diameter surface 24 of the planet gear 10 is provided by the inside diameter bearing surface 64.

Advantages provided by the invention relating to increasing lubricant flow to the shaft outside diameter 34, the needle roller bearing 20, and the inside diameter bearing surface 64 of the planet gear 10, are best understood by tracing a flow path 66 of the lubricant to the needle roller bearing 20 induced by rotation of the carrier 17. The rotation causes lubricant reaching the carrier flange 16 by splash, spray, or other conventional means to radiate outward along the side 28 of the carrier flange 16. The channel 26 in the carrier flange 16 directs lubricant toward the shaft 18. Upon reaching the shaft 18, the lubricant flow 66 follows the outside diameter 34 of the shaft 18 axially, past the inside diameter 32 and 60 of the thrust washer 12, 13, lubricating the needle roller bearing 20 and the bearing surface 64 of the planet gear 10 as well as the shaft 18.

Other advantages are apparent from an assembly technique made possible by this invention. The needle roller bearing 20 is placed inside the planet gear 10. The planet gear ends 14 are smeared with a light application of grease. The thrust washers 12, 13 are pressed against the now greasy ends 14 of the planet gear 10, with the piloting relationship between the thrust washers 12, 13 and the planet gear 10 radially locating the thrust washers 12, 13. The assembled planet gear 10, needle roller bearing 20, and thrust washers 12, 13 are placed between the two carrier flanges 16 and aligned with coaxial apertures 68 passing through the carrier flanges 16. The shaft 18 is passed through the aperture 68 in one carrier flange 16, through the assembled planet gear 10 and the needle roller bearing 20, and into the aperture 68 in the other carrier flange 16 such that the shaft 18 is supported by the carrier flanges 16. The shaft 18 is then axially and rotatively fixed in place relative to the carrier flanges 16 by staking or other conventional means.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A thrust washer and a planet gear and a planet gear carrier, in combination, the planet gear rotatively supported by a shaft, the shaft supported by a pair of carrier flanges of the planet gear carrier, the gear disposed between the carrier flanges, a needle roller bearing radially disposed between the shaft and the gear, the thrust washer concentric with the gear and the shaft, the thrust washer being axially disposed between the gear and one of the carrier flanges, comprising:

the planet gear having a plurality of circumferentially located engaging teeth, an inside diameter bearing surface contiguous with the needle roller bearing, and having a washer pilot cylindrical recess including an inside diameter surface;

the thrust washer having a washer pilot outside diameter surface complementary to the washer pilot inside diameter surface of the planet gear, the washer pilot outside diameter surface of the thrust washer rotatively disposed within the washer pilot inside diameter surface of the planet gear, the washer pilot outside diameter surface having a piloting relationship with the washer pilot inside diameter surface of the planet gear and being located therein; and the thrust washer having a minimum inside diameter approximately equal to an outside diameter of the shaft plus a diameter of a needle roller of the needle roller bearing wherein an axially extending surface of the outside diameter surface of the washer is located within an overall axial extention of said gear.

2. A thrust washer and a planet gear and a planet gear carrier as described in claim 1, further comprising:

the thrust washer having a flat annular shape with the minimum inside diameter being the shaft outside diameter plus twice the needle roller diameter and having an outside diameter less than an outside diameter of the gear;

the washer pilot outside diameter surface of the thrust washer being provided by the outside diameter of the flat annular shape; and the washer pilot inside diameter of the pilot gear being provided by a cylindrical recess in an end of the gear, the recess having a depth less than a thickness of the thrust washer.

3. A thrust washer and a planet gear and a planet gear carrier as described in claim 2, further comprising:

the carrier flange having a lubrication channel on a side proximate to the washer, and radiating inward from the shaft.

4. A thrust washer and a planet gear and a planet gear carrier as described in claim 1, further comprising:

the thrust washer having an annular portion;

the thrust washer having a cupped portion projecting from the annular portion at an inside diameter edge of the annular portion, having a cupped portion flange projecting radially inward at an end of the cupped portion distal to the annular portion, the cupped portion flange forming the minimum inside diameter of the thrust washer;

the washer pilot outside diameter of the thrust washer provided by an outside diameter of the cupped portion; and the washer pilot inside diameter of the planet gear being the inside diameter bearing surface.

5. A thrust washer and planet gear and planet gear carrier as described in claim 4, further comprising:

the carrier flange having a lubrication channel on a side proximate to the washer.

* * * * *